(12) United States Patent
Alexander

(10) Patent No.: US 12,732,502 B2
(45) Date of Patent: Sep. 8, 2026

(54) REAL-TIME CONFERENCE MONITORING AND ALERTING FOR SENSITIVE INFORMATION

(71) Applicant: Cisco Technology, Inc., San Jose, CA (US)

(72) Inventor: William Sterling Alexander, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 18/636,806

(22) Filed: Apr. 16, 2024

(65) Prior Publication Data

US 2025/0323918 A1 Oct. 16, 2025

(51) Int. Cl.
*H04L 9/40* (2022.01)
*G06F 40/20* (2020.01)
*H04L 12/18* (2006.01)

(52) U.S. Cl.
CPC .............. *H04L 63/10* (2013.01); *G06F 40/20* (2020.01); *H04L 12/1822* (2013.01)

(58) Field of Classification Search
None
See application file for complete search history.

(56) References Cited

U.S. PATENT DOCUMENTS 9,712,571 B1 7/2017 Bertz et al.
11,397,803 B2 7/2022 Giralt
11,870,824 B1 * 1/2024 Singh .................. H04L 65/4015
2003/0069828 A1 * 4/2003 Blazey .................... H04L 67/62 348/E7.083
2009/0220064 A1 * 9/2009 Gorti .................. H04L 65/4038 379/202.01
2014/0082100 A1 * 3/2014 Sammon ............. G06Q 10/101 709/204
2015/0271206 A1 9/2015 Schultz et al.
2016/0269449 A1 * 9/2016 Modai ................ H04L 65/4038
2024/0243941 A1 * 7/2024 Nambannor Kunnath ................. H04L 12/1831
2024/0395259 A1 * 11/2024 Hilmarsson ............ H04N 7/155
2025/0006201 A1 * 1/2025 Adlersberg ............. G10L 17/14

FOREIGN PATENT DOCUMENTS

CN 110401811 A 11/2019
WO 2022026020 A1 2/2022

* cited by examiner

*Primary Examiner* — Raqiul A Choudhury
(74) *Attorney, Agent, or Firm* — Edell, Shapiro & Finnan, LLC

(57) ABSTRACT

A transcript of a communication session is transmitted to a large language model (LLM) while the communication session is occurring. An indication of a security level associated with a current topic of the communication session is received from the LLM based on the transcript. It is determined whether a participant of the communication session is authorized to receive information associated with the current topic based on the security level associated with the current topic. One or more actions are performed when the participant is not authorized to receive the information associated with the current topic.

20 Claims, 7 Drawing Sheets

REAL-TIME CONFERENCE MONITORING AND ALERTING FOR SENSITIVE INFORMATION

TECHNICAL FIELD

The present disclosure relates to communication session security.

BACKGROUND

Projects and documents in corporate and government environments are often protected with certain access controls. The data behind the projects may be restricted based on different types and levels of protection, including Role Based Access Control, Security Clearance Levels, or specific lists of users authorized to view a file. Issues may arise if a conversation or a topic of a meeting shifts from one context to another that only some attendees of the meeting are authorized to participate in, or from a lower security clearance topic to a related topic of higher security clearance.

DETAILED DESCRIPTION

Overview

Figure 1:
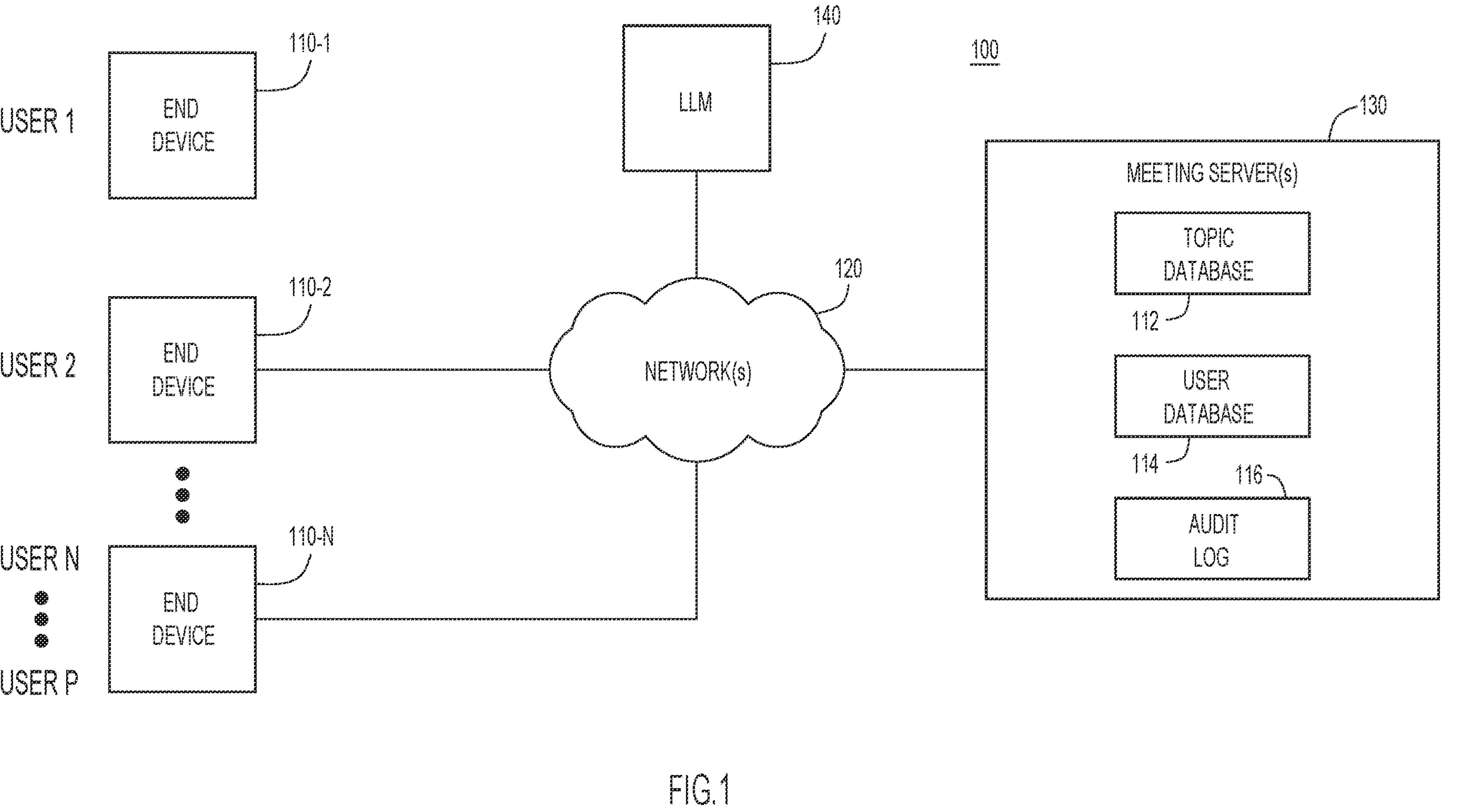
FIG. 1 illustrates a high-level diagram of a system in which the techniques presented herein may be employed, according to an example embodiment.

Presented herein are systems and methods for performing one or more actions when a participant is not authorized to receive information associated with a topic in a communication session. The methods involve transmitting a transcript of a communication session to a large language model (LLM) while the communication session is occurring. An indication of a security level associated with a current topic of the communication session is received from the LLM based on the transcript. It is determined whether a participant of the communication session is authorized to receive information associated with the current topic based on the security level associated with the current topic. One or more actions are performed when the participant is not authorized to receive the information associated with the current topic.

Example Embodiments

In a corporate/business/government entity environment, various projects may be restricted to users with particular levels of security clearance or based on the signing of a Non-Disclosure Agreement (NDA), with only signers being allowed to view details of the project. It may be necessary to keep projects that are internal to one business unit, such as product roadmaps, within organization boundaries. Some topics (e.g., performance reviews, salary, and complaints) may be restricted to, for example, human resource (HR) personnel, managers, or a reporting chain for HR issues. Financial details may be restricted based on quiet period. All of these data types may be restricted based on a role-based or user-based access.

For government employees, contractors, military, and related fields, highly classified documents may be routinely shared in video conferences and classified topics may be discussed. In these scenarios, the attendees of a meeting should have a proper security level to join and participate in such meetings. Today, this is enforced largely through social means, with the attendees of the meeting needing to be careful not to speak about classified documents or to ensure that the correct level of clearance is obtained by everyone who has been invited.

In any of these scenarios, there may be an issue if a conversation gradually shifts from one context to another which only some attendees of the meeting are privy to, or from a lower security clearance topic to a related topic of higher security clearance. The participants in the meeting may not be aware of the security clearances of the other participants in the meeting. The attendees who have proper clearance may not realize that certain people who have joined the meeting are not of the proper clearance, role, or organization. Without proper verification of security levels of participants in the meetings, restricted materials may be transmitted to or viewed by unauthorized participants.

In addition, if a breach occurs, someone in the meeting also should bring the breach to the attention of a security response team. In some cases, participants may not want to bring the breach to the attention of the security response team because the participants do not want to admit to allowing an authorized participant to access privileged information. Ideally there should be a way to indicate to users if someone does not have the appropriate credentials to hear a discussion, without assuming everyone in the meeting will remember to not discuss these issues and that correct actions are taken if such a breach of etiquette or security occurs.

In some cases, security clearance level flags may be placed on devices to indicate if the topic of a meeting is at "Confidential," "Secret," or "Top Secret" clearance level. If a participant joins a meeting with a "Top Secret" designation and the participant's clearance is only "Secret," then the participant is asked to leave the meeting. Similarly, if the topic coming up in a meeting goes from "Secret" to "Top Secret," then it is expected that the security level flag is raised for the meeting so that participants are aware of the change in security level. However, the flags can be missed and data can inadvertently be leaked in these cases.

Some large language models (LLMs), such as Generated Pre-Trained Transformer (GPT) and the ChatGPT interface have adapted to be able to classify new data in related domains, while vector databases and knowledge graphs bring additional documents and datasets into LLMs. LLMs help to classify any type of text and can be used in helping to identify many data types, including tagged confidential data based on topics, through supervised learning. Topic modeling has been used to identify discussion points for action items, meeting summaries, etc.

Techniques presented herein leverage LLMs to classify topics of online meetings as the meeting are occurring. According to techniques presented herein, an LLM may identify a current topic associated with a communication session and determine a security level associated with the topic. In some embodiments, the LLM may identify the security level associated with a topic using a topic database that maps topics to security levels. Clearance levels of participants of the communication session are identified (e.g., using a user database) to determine whether the participants are authorized to receive information associated with the topic. If a participant is not authorized to receive information associated with the topic, an action may be taken. For example, the participant may be removed from the meeting, audio or visual information may be muted or obscured for the participant, a security alert or flag may be issued to indicate a security breach, etc.

Reference is now made to FIG. 1, which shows a high-level diagram of a system 100 that includes a plurality of end devices 110-1 to 110-N, one or more servers 130 that support a communication session application on behalf of the end devices, and a large language model (LLM) 140. Each end device 110-1 to 110-N is associated with one or more users, User 1 to User P. End devices 110-1 to 110-N may communicate with the server(s) 130 via a data network (e.g., the Internet) 120. The server(s) 130 are configured to provide an online service for hosting a communication session among end devices 110-1 to 110-N. For example, server(s) 130 may host an online meeting, audio conference call, video conference/meeting, text/audio/video messaging session, or other type of communications space for sharing information among end devices 110-1 to 110-N.

Each end device 110-1 to 110-N may be a videoconference endpoint or may be an individual endpoint device, such as a tablet, laptop computer, desktop computer, Smartphone, virtual desktop client, virtual whiteboard, or any user device now known or hereinafter developed. End devices 110-1 to 110-N may have a dedicated physical keyboard or touch-screen capabilities to provide a virtual on-screen keyboard to enter text. End devices 110-1 to 110-N may also have short-range wireless system connectivity (such as Bluetooth™ wireless system capability, ultrasound communication capability, etc.) to enable local wireless connectivity (e.g., with other devices in the same meeting room).

As illustrated in FIG. 1, end devices 110-1 and 110-2 are each associated with a single user (e.g., User 1 and User 2, respectively). End device 110-N is associated with multiple users (e.g., User N to User P). In this example, end device 110-N may be a videoconference endpoint designed for use by multiple users (e.g., a videoconference endpoint in a meeting room).

A videoconference endpoint may include a camera and microphones that may be connected to the videoconference endpoint (e.g., with wires or wirelessly) or may be integrated with the videoconference endpoint. The camera may be used to capture video of participants in a meeting room and the microphones may be used for capturing audio of the participants in the meeting room (e.g., for transmitting to other end devices during an online meeting). In some embodiments, facial recognition may be performed in conjunction with the camera or voice fingerprinting may be performed in conjunction with the microphones to identify participants in the room. For example, facial recognition or voice fingerprinting may be used to determine which participants are participating in an online meeting to ensure that each participant has the proper clearance or authorization to receive information shared during the meeting.

Server(s) 130 may include topic database 112, user database 114, and audit log 116. Topic database 112 is a data store that includes entries that store information associated with topics and a security policy for each topic. When a meeting begins, a chat room is created, a document is created, etc., the security policy level for that associated topic may be recorded. The determination of the policy level for a topic may be done in several ways depending on the necessary policy decisions. For example, the policy level or attributes may indicate a security clearance level, role, attributes (e.g., signing of a non-disclosure agreement (NDA) or being part of a team), or a list of users who may access information associated with a file or project. This security information (e.g., the data, the topic, and the security attributes) may be stored in topic database 112.

User database 114 is a data store that stores entries corresponding to the users in an organization/company/enterprise and security information associated with the users. For example, for each user, user database 114 stores the role, security clearance level, and/or any other relevant metadata associated with the user account (e.g., whether the user has signed an NDA, whether the user is on a list of authorized users, etc.) for a desired policy (e.g., role-based access control (RBAC), attribute-based access control (ABAC), clearance level, etc.).

Audit log 116 stores information associated with a communication session (e.g., online meeting, messaging space, etc.) and participants associated with the communication session. For example, audit log 116 may store an entire roster list of those who were participating in the communication session, the information that was discussed (e.g., based on topic matching), and a timestamp, for forensic analysis and containment. If a security breach occurs (e.g., an unauthorized participant receives classified information), the audit log 116 may be updated with information about the security breach (e.g., the participant, a clearance level associated with the participant, the information/topic, security levels associated with the information/topic, other participants involved (e.g., a participant who presented the information, a host of a meeting, other participants in the communication session, etc.), and other information such as timestamps). The audit log 116 may be used to perform an investigation into a data breach or leak.

LLM 140 is an underlying LLM model or an integrated model application that may be used to classify a topic of a communication session based on data and information associated with the communication session. For example, LLM 140 may identify a topic of a communication session based on documents associated with the communication session, an agenda of the communication session, a synopsis of the communication session, content shared during the communication session, information discussed or presented during the communication session, etc. When LLM 140 identifies a topic of the communication session, LLM 140 may perform a lookup in topic database 112 using the topic to identify a security level or attribute associated with the topic and the privilege attributes associated with the communication session. In some embodiments, LLM 140 may identify a topic of the communication session, transmit the topic to server(s) 130, and server(s) 130 may perform a lookup in topic database 112 using the topic to identify the security level or attribute associated with the topic and the privilege attributes associated with the communication session.

LLM 140 may be trained using previous meeting data, chat records, and documents that have been classified into topics. In addition, a privilege level may be applied to the document or project (e.g., access based on role, attribute, security clearance level, etc.). The previous documents and projects may be manually classified (e.g., by adding to a folder or project with tagged data). As the meeting data, chat records, and documents are fed into the LLM 140, the LLM 140 gains context of each project and can classify future data based on the training. As part of the training, LLM 140 may perform automatic classification of documents, such as by performing unsupervised classification that groups documents and asks for confirmation. To better automate the process, the topic database 112 may be used to perform fine tuning of the LLM 140 through transfer learning (such as Low Rank Adaptation models), vector database integration, or a very large context window.

In the case of an online meeting, a messaging space, or other communication session, LLM 140 may be used to identify the topic and security level/privilege attributes of the communication session while the communication session is occurring. As a meeting or conversation progresses, the discussion may shift, and the topic/security level may also change. It is important to ensure that all participants in the communication session are authorized to receive information associated with a new topic. To perform real-time monitoring of the topic of a communication session, LLM 140 may continuously receive information associated with the meeting or conversation. In one embodiment, LLM 140 may continuously receive a transcript of the communication session and may classify the topic of the communication session based on the information. In one embodiment, the transcript may be, for example, a transcript of audio spoken during the communication session or messages/chats sent or shared during the communication session. In another embodiment, the transcript may include an indication of content shared during the meeting or communication session or real time information associated with data being fed into or used to update wikis, slides, documents, etc. while the communication session is occurring. The LLM 140 may classify the topic of the shared content or the communication session based on the information in the transcript.

The topic could automatically be detected, multiple topics may be identified, or a shift of topics over time may be identified by the LLM 140. The LLM 140 may then perform a look up in topic database 112 to identify the privilege level of the new topic or topics. If any of the topics shifted from an originally lower privilege topic to a more privileged topic, the security level of the meeting may automatically be raised. In some embodiments, the privilege level may be applied to the communication session. In other embodiments, the privilege level may be applied to shared content (e.g., a document, wiki, slide, etc.).

When LLM 140 (or server(s) 130) identifies a security level associated with a meeting or communication session, server(s) 130 may perform a lookup in user database 114 to determine whether all participants in the meeting are authorized to receive information associated with the topic of the meeting/communication session. For example, server(s) 130 may determine a security level or other security attribute associated with each participant and determine whether the participant's security level (or other security attribute) is high enough or sufficient to participate in or receive information associated with the meeting or communication session. For example, if a topic of a meeting is classified as Top Secret and a participant has a Secret clearance level, the participant is not authorized to participate in or receive information associated with the meeting.

If a participant is not authorized to receive information associated with a meeting or communication session, server(s) 130 may perform a number of actions to ensure the security of the privileged information associated with the meeting. In one embodiment, if the participant has not yet joined the meeting or communication session, server(s) 130 may prevent the unauthorized participant from joining the meeting or communication session. For example, when a user attempts to join the meeting or communication session, server(s) 130 may perform a lookup in topic database 112 to identify the user's security level and, if the user's security level is not high enough to participate in the meeting or communication session based on a security level of the meeting or the communication session, the participant may be prevented from joining the meeting or communication session. In another embodiment, the user may be permitted to join the meeting, but additional actions may be taken to enforce a policy action associated with the meeting.

If a user is participating in the online meeting or communication session and the topic changes to include information the user is not authorized to receive or content is shared that the user is not authorized to view, an action may be taken to alert other participants that the user is not authorized to receive the information. In one embodiment, a warning banner may be raised indicating that a participant of the meeting or communication session is not authorized to receive information about the current topic. In another embodiment, the host(s), moderator(s), presenter(s), administrator(s), security personnel, or other users may be directly alerted (e.g., by a message, a pop up, etc.) about the presence of an unauthorized participant. In some cases, the hosts may be prompted that the role of the user should be changed or the host should add the user to an access control list of privileged users associated with the project to continue the meeting. In some embodiments, a clearance level flag may be lowered (in the case of security clearance levels).

Audit log 116 may additionally be updated with information about the security breach (e.g., a topic being discussed, a security level of the topic, information associated with the unauthorized or underprivileged user, information associated with other participants of the communication session, etc.). For reporting, audit logging, and other analysis by a security response team, in the event of a data breach, the entire roster list of those who were speaking could be used to trace back who has been leaked certain information, what information (based on topic matching), and when, for forensic analysis and containment. On the occurrence of a breach of access, an indication of the breach may be automatically sent to a security response team and the security response team may review the audit log 116 to perform an investigation associated with the breach.

In other embodiments, actions may be taken to prevent the user from receiving the information that the user is unauthorized to receive. For example, if a document is shared on the screen, a whiteboard is loaded, etc., with new information of a higher security attribute that a joined user is not privileged to view, the meeting's security privilege may be updated and a policy action may be taken. In one embodiment, the user may be removed from the meeting or communication session when a topic is discussed or content is shared that requires a higher security level than the user possesses. In another embodiment, if a document is to be shared and all users in the meeting or communication session do not meet the security requirements for viewing the document, the document may be prevented from being shared and a warning may be given. In another embodiment, authorized participants may be permitted to view the document and unauthorized participants may be prevented from viewing the document. For example, the shared document may be obscured on the end device of the underprivileged user and audio associated with the document may be muted for the user.

In the case of an online meeting in which several participants are participating in the meeting in a room using a single videoconference endpoint, individual users in the room may be identified. For example, the users may be identified using face recognition, voice fingerprinting, and identification through pairing a user's device (e.g., ultrasound pairing to the device through laptop or mobile phone), etc. Any of these methods may be used to identify a user in a local meeting, as well as on a remote conference bridge. As a result, the security clearance level of each participant could be assessed, not just through the identity they present when joining a remote meeting, but also based on identifying the users in the physical room. For example, a lookup may be performed in user database 114 to identify the credentials or clearances associated with the users in the physical rom in addition to the users joining remotely. If one or more of the users identified in the room are unauthorized to receive information associated with a topic being discussed during the meeting or information being shared, some of the same restrictions or security enforcement applications could be applied to the local meeting. For example, the proper users may be alerted of the security incident, a flag may be raised on the video screen to indicate a security level mismatch, etc. In some cases, the audio to the room may be muted and/or documents being shared may be obscured.

Figure 2:
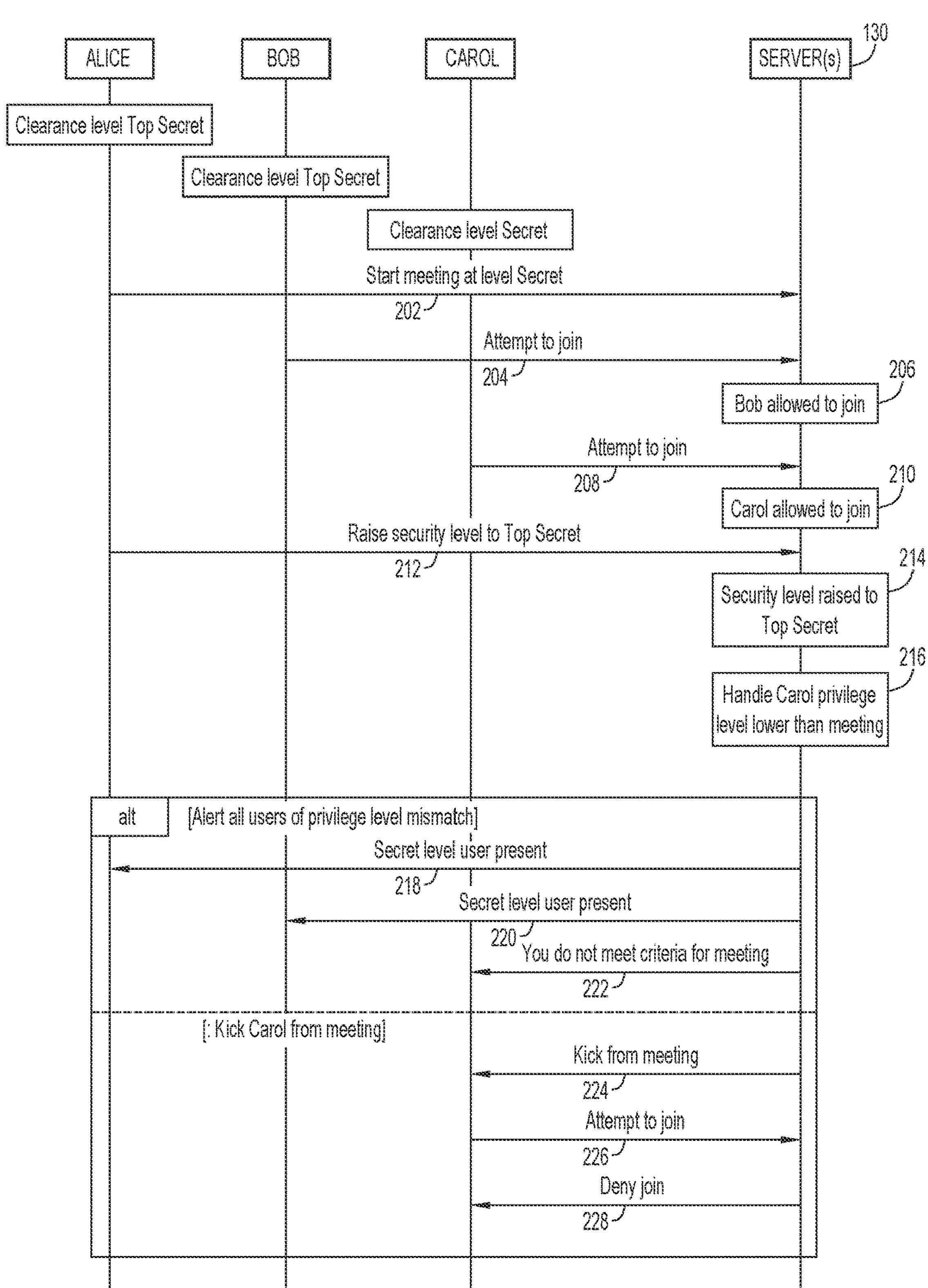
FIG. 2 is a message sequence diagram illustrating a method of performing one or more actions when a participant is unauthorized to receive information associated with a topic in a communication session, according to an example embodiment.

Reference is now made to FIG. 2. FIG. 2 is a flow diagram of a method 200 of performing one or more actions when a user in a meeting does not have sufficient credentials or security clearance/attributes to receive information associated with a topic of a communication session. Method 200 may be performed by server(s) 130 in conjunction with one or more end devices 110-1 to 110-N and LLM 140 (not illustrated in FIG. 2). In the example illustrated in FIG. 2, participant Alice is a host of a meeting and has a Top Secret clearance level, participant Bob is a participant in the meeting and has a Top Secret clearance level, and participant Carol is a participant in the meeting and has a Secret clearance level. Alice, Bob, and Carol may be participating in the meeting using separate end devices 110-1 to 110-N or one or more of Alice, Bob, and Carol may be participating in the meeting from the same room using a videoconference endpoint.

At 202, the meeting starts at level Secret. In one embodiment, the meeting level may be set by an explicit setting. For example, a host, administrator, or other user may set the level of the meeting. In another embodiment, the level Secret may be inferred through context. For example, LLM 140 may identify a topic of the meeting based on information associated with the meeting (e.g., a meeting invite, content that is to be presented during the meeting, documents associated with the meeting, an agenda for the meeting, etc.) and the level of the meeting may be set based on a topic of the meeting (e.g., by performing a lookup in topic database 112). At 204, Bob attempts to join the meeting. At 206, server(s) 130 determines that Bob is allowed to join the meeting. At 208, Carol attempts to join the meeting and, at 210, server(s) 130 determines that Carol is allowed to join the meeting. Bob and Carol are both able to join the meeting because the meeting is started at level Secret and both Bob and Carol have security clearances of Secret or higher (e.g., Top Secret).

At 212, server(s) 130 is notified that the security level of the meeting is raised to Top Secret. For example, as illustrated in FIG. 2, host participant Alice may raise the level of the meeting to Top Secret. In another embodiment, LLM 140 may determine that the topic of the meeting has changed and the new topic is a Top Secret level topic. At 214, server(s) 130 raise the security level of the meeting to Top Secret. At 216, server(s) 130 determines that Carol's privilege level is lower than the level of the meeting. For example, server(s) 130 may perform a lookup in user database 114 and determine that Carol's clearance level of Secret is too low to receive information associated with the Top Secret level meeting.

The server(s) 130 may take one or more actions based on determining that one of the participants is unauthorized to receive information associated with the meeting. For example, server(s) 130 may alert all participants of the privilege level mismatch. At 218 and 220, server(s) 130 may notify Alice and Bob, respectively, that a Secret level participant is present in the Top Secret meeting. For example, server(s) 130 may raise a flag, transmit a warning for display on the participants' screens, send messages to the participants, etc. At 222, server(s) 130 may notify Carol that Carol does not meeting the criteria for the meeting. Server(s) 130 may additionally notify security personnel, administrators, or other users of the security breach. Server(s) 130 may also update audit log 116 with information associated with the security breach.

In another embodiment, at 224, server(s) 130 may remove Carol from the meeting. Carol may be removed from the meeting and not be allowed to rejoin the meeting until the security level associated with the meeting is lowered. For example, at 226, Carol may attempt to rejoin the meeting and, at 228, server(s) 130 may deny Carol's request to join the meeting. If the security level of the meeting is lowered to Secret, Carol may be allowed to join the meeting again.

In some embodiments, more than one action may be taken. For example, Carol may be removed from the meeting and the participants may be alerted that a possible security breach may have occurred.

In other embodiments not illustrated in FIG. 2, Carol may be allowed to remain in the meeting, but Top Secret documents may be obscured on Carol's end device or audio transmitted to Carol may be muted. Alternatively, host participant Alice may be prompted to authorize Carol to be added to the privileged project so Carol may remain in the meeting.

Figure 3A:
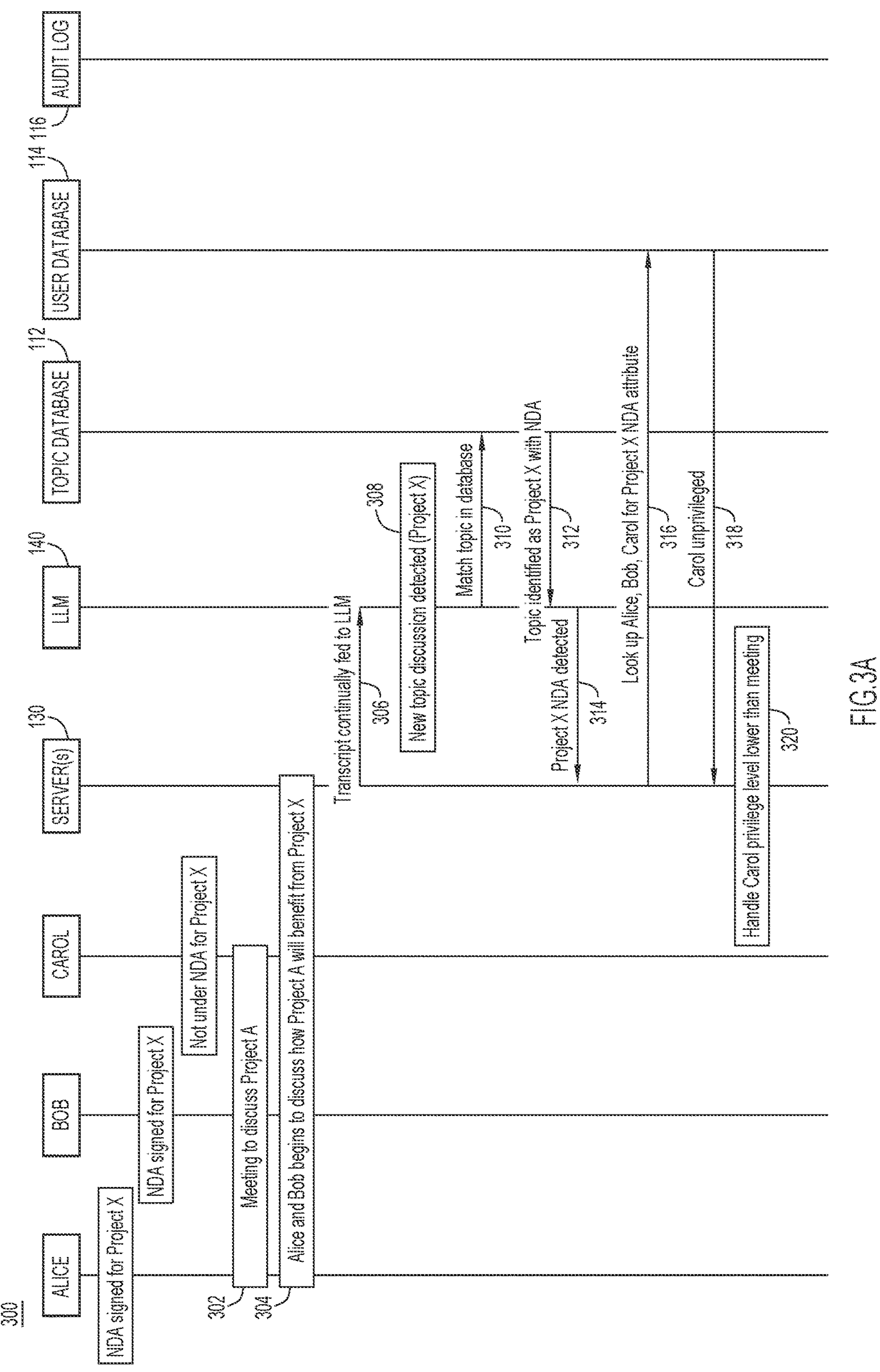
FIGS. 3A and 3B show a message sequence diagram illustrating a method of identifying a current topic of a communication session and performing one or more actions when a participant is unauthorized to receive information associated with a topic in a communication session, according to an example embodiment.
Figure 3B:
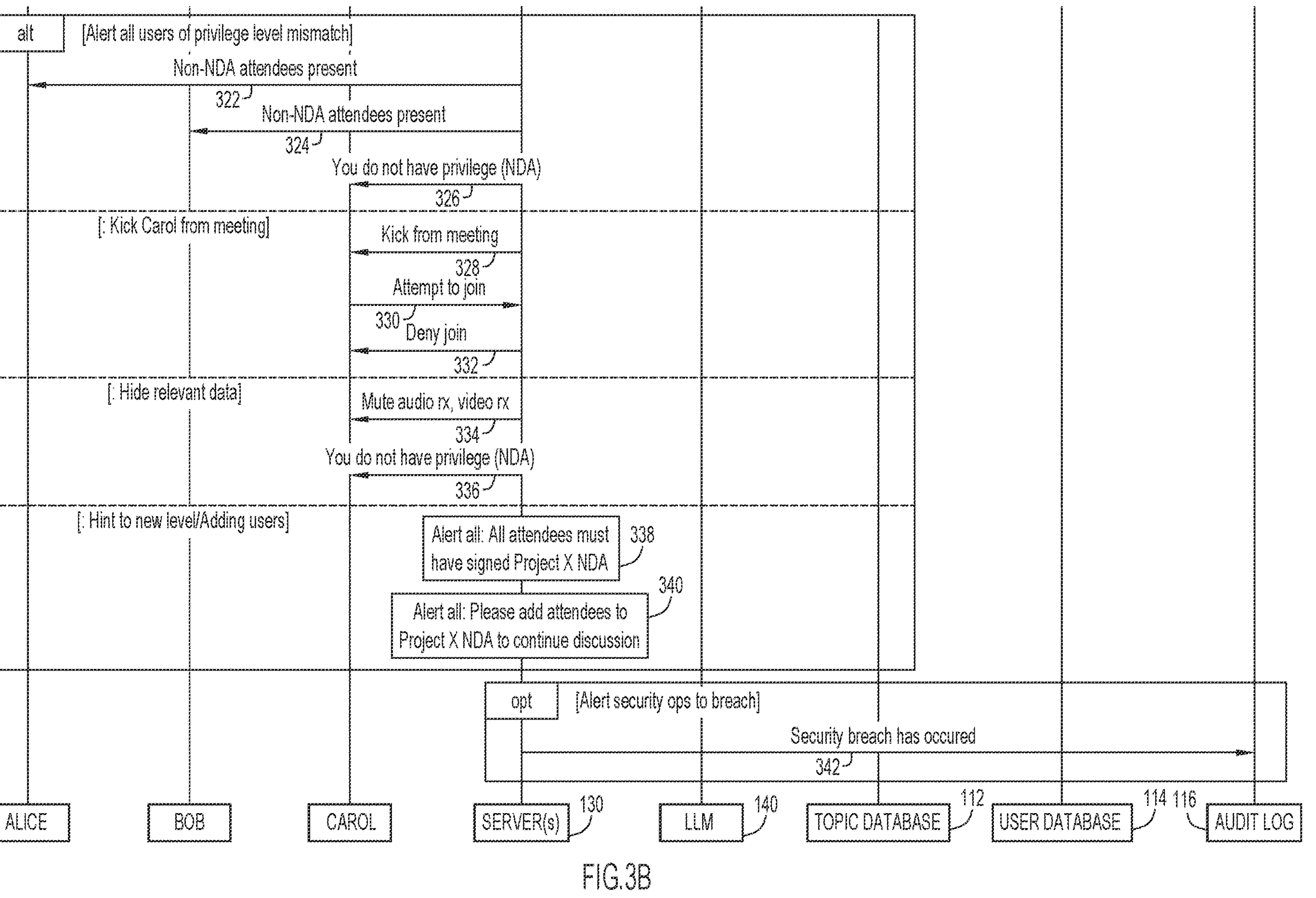

Reference is now made to FIGS. 3A and 3B. FIGS. 3A and 3B show a flow diagram illustrating a method 300 of performing one or more actions with respect to an underprivileged user when a topic of a meeting has changed to a topic with a higher level of security than the privilege level of a particular user. Method 300 may be performed by server(s) 130 and LLM 140 in conjunction with one or more end devices 110-1 to 110-N (not illustrated in FIGS. 3A and 3B).

As shown at 302 in FIG. 3A, Alice, Bob, and Carol are participating in a meeting to discuss Project A. Alice, Bob, and Carol may be participating in the meeting using separate end devices 110-1 to 110-N or one or more of Alice, Bob, and Carol may be participating in the meeting from the same room using a videoconference endpoint. In this example, Alice and Bob have signed an NDA for Project X and Carol has not signed an NDA for Project X. At 304, Alice and Bob begin to discuss how Project A will benefit from Project X. Server(s) 130 may be continuously transcribing the audio of the meeting and the discussion associated with Project X may be included in the transcript.

At 306, the transcript of the text of the meeting is continually fed to LLM 140. For example, the transcript of the meeting may be sent to LLM 140 every few seconds. In some embodiments, in addition to the transcript, server(s) 130 may transmit information associated with shared content to LLM 140. For example, information associated with slides, a screen, a whiteboard, wikis, etc. that is currently being shared may be transmitted to LLM 140 for analysis and determination of a topic. In addition, if additional information is added to the shared content (e.g., a user updates or edits a slide, adds information on a whiteboard, etc.), the added information may be transmitted to LLM 140 for analysis and identification of any new topics being discussed or shared. In this case, the additional information may be added to the shared content while the content is being shared or while the content is not being shared. In one example, the shared content with the additional content (or just the additional content) may be transmitted to LLM 140 for analysis as the additional content is being added while the content is being shared. As another example, the additional content may be added to content while the content is not being shared and the additional content or the content that includes the additional content may be transmitted to LLM 140 for analysis when the content is shared or without the content being shared.

At 308, LLM 140 may detect that a new topic, Project X, is being discussed. For example, LLM 140 may analyze the transcript (and/or shared content) and, based on the training of LLM 140, may identify that the topic Project X is being discussed during the meeting. At 310, LLM 140 performs a lookup in topic database 112 to determine a security level or security measures/attributes associated with the topic "Project X." At 312, LLM 140 identifies from topic database 112 that there is an NDA associated with Project X. In other words, users privileged to receive information associated with Project X should have signed an NDA.

At 314, LLM 140 transmits a message to server(s) 130 indicating that the new topic of Project X is being discussed and that participants privileged to discuss Project X or receive information associated with Project X should have signed an NDA. At 316, server(s) 130 may perform a lookup in user database 114 to determine whether the participants of the meeting (e.g., Alice, Bob, and Carol) have signed an NDA associated with Project X. If a participant has signed the NDA, user database 114 may include a Project X NDA attribute for the participant. At 318, server(s) 130 determines from user database 114 that Carol is not privileged to receive information associated with Project X (e.g., because user database 114 does not include a Project X NDA attribute for Carol). At 320, server(s) 130 may determine one or more actions to take when it is determined that an underprivileged user is participating in a meeting in which Project X is being discussed.

In one embodiment, all participants in the meeting may be alerted of a privilege level mismatch. At 322 and 324, Alice and Bob may be alerted, respectively, that one or more non-NDA attendees are present. Similarly, at 326, Carol may be alerted that Carol does not have privilege (e.g., because Carol has not signed an NDA to discuss Project X). The alerts may automatically be transmitted to end devices 110-1 to 110-N for presentation on the screens of the participants. In other embodiments, the alerts may be messaged to the participants or transmitted to the participants in other ways.

In another embodiment, Carol may be removed from the meeting. For example, at 328, Carol may be removed from the meeting. At 330, Carol may attempt to rejoin the meeting and, at 332, the join request may be denied by server(s) 130. If the topic switches and Project X is no longer being discussed, Carol may be permitted to join the meeting once again. In this case, LLM 140 may determine, from the continuously received transcript, that Project X is no longer a topic of conversation and LLM 140 may transmit a message to server(s) 130 indicating that the NDA attribute is no longer required for participation in the meeting.

In another embodiment, data or information associated with Project X may be hidden from the underprivileged participant Carol. At 334, the receiver audio and video may be muted for Carol. For example, Carol may no longer receive audio from the meeting and shared content may be obscured or the entire video of the meeting may be obscured at Carol's end device. At 336, server(s) 130 may additionally send Carol an alert indicating that Carol does not have privilege (e.g., because Carol has not signed the NDA for Project X). In this way, Carol may identify why the audio and video have been muted and not assume a malfunction associated with the meeting or end device has occurred.

In another embodiment, an alert may be sent to all participants indicating a new level of security associated with the meeting and an indication that all participants should be added to the Project X NDA to continue the discussion. For example, at 338, server(s) 130 may alert all participants that all attendees should have signed the Project X NDA to discuss the current topic. At 340, server(s) 130 may alert all participants that all attendees should be added to the Project X NDA to continue the discussion. In this way, Carol may be prompted to sign the NDA for Project X or the discussion of Project X may be stopped.

In another embodiment, at 342, server(s) 130 may update audit log 116 indicating that a security breach has occurred. For example, audit log 116 may be updated with information about the topic (e.g., Project X), security measures associated with the project (e.g., an NDA attribute), information associated with the participants in the meeting, information associated with the unauthorized participant (e.g., Carol), information associated with actions taken (e.g., removing the participant from the meeting, muting audio/video for the participant, alerting participants to the breach, etc.), and/or other information.

In some embodiments, more than one action may be taken. For example, the participants may be alerted to the breach, the underprivileged user may be removed from the meeting or the audio/video may be muted, and audit log 116 may be updated with information associated with the security breach. By continuously updating LLM 140 with current information being discussed during the meeting (e.g., by continuously transmitting a transcript of the audio or information associated with shared content), a current topic of a communication session may be determined in near real time and security requirements associated with the current topic may be determined quickly and automatically. In this way, security measures may be taken before a security breach occurs or participants may be alerted quickly if a security breach has occurred.

Figure 4:
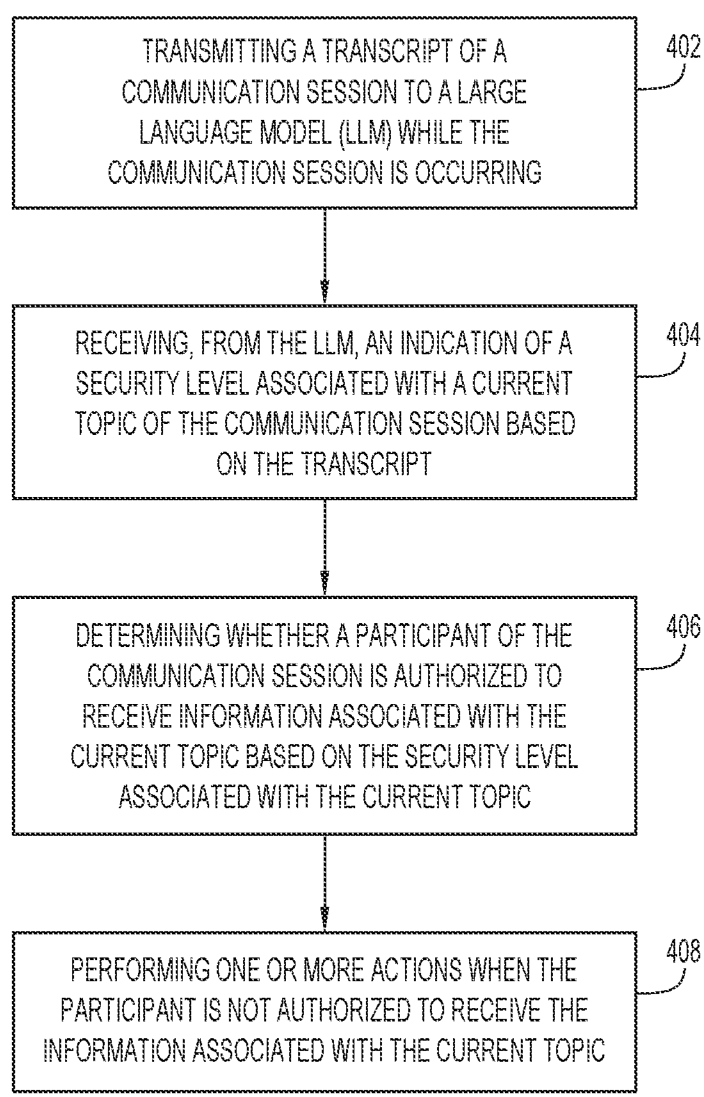
FIG. 4 is a flow diagram illustrating a method of performing one or more actions when a participant is unauthorized to receive information associated with a topic in a communication session, according to an example embodiment.

Reference is now made to FIG. 4. FIG. 4 is a flow diagram illustrating a method 400 of performing one or more actions when a participant of a communication session is not authorized to receive information associated with a current topic of the communication session. Method 400 may be performed by server(s) 130 in conjunction with LLM 140 and one or more end devices 110-1 to 110-N.

At 402, a transcript of a communication session is transmitted to a large language model (LLM) while the communication session is occurring. For example, server(s) may transmit a transcript of the audio of a communication session, messages sent during a communication session, content shared during a communication session, etc. to LLM 140 while the meeting is occurring. For example, the transcript may be transmitted to LLM 140 every few seconds.

At 404, an indication of a security level associated with a current topic of the communication session may be received from the LLM based on the transcript. For example, LLM 140 identify a topic associated with the communication session based on analyzing the transcript and may perform a lookup in topic database 112 using the topic to determine a security level associated with the topic. The security level may indicate a security clearance level required by participants to participate in a communication session associated with the topic, certain attributes (e.g., signing of an NDA) required by participants to participate in a communication session associated with the topic, or other security information.

At 406, it is determined whether a participant of the communication session is authorized to receive information associated with the current topic based on the security level associated with the current topic. For example, server(s) 130 may perform a lookup in user database 114 for each participant in the communication session to determine whether each participant is authorized to receive information associated with the current topic. For example, user database 114 may store information about a security clearance associated with each participant, certain attributes associated with each participant (e.g., whether the participant has signed an NDA for particular projects or topics), etc. Server(s) 130 may determine whether each participant has a high enough security clearance or has the appropriate attributes to receive information associated with the current topic based on the security level associated with the current topic.

At 408, one or more actions are performed when the participant is not authorized to receive the information associated with the current topic. For example, the participant may be removed from the communication session, audio and/or video associated with the current topic may be muted or obscured for the particular participant, alerts may be transmitted to the participants in the communication session indicating that an underprivileged participant is present in the communication session, an indication that the participant should be added to a list of participants authorized to participate in communication sessions associated with the current topic may be sent to a host or administrator, information about the security breach may be logged in audit log 116, or other actions may be taken.

In summary, the method 400 prevents the inadvertent leaking of data when attendees of a meeting are unsure of the level of access of others, inadvertent escalation of a conversation from a lower to higher privileged topic, and prevents people from continuing conversations while leaking information through negligence during a meeting. On the occurrence of such a breach of access, the issue may be automatically logged for review by a security response team. It does this through classifying content and discussions in those meetings with data tagged either manually or in real time using a LLM.

Figure 5:
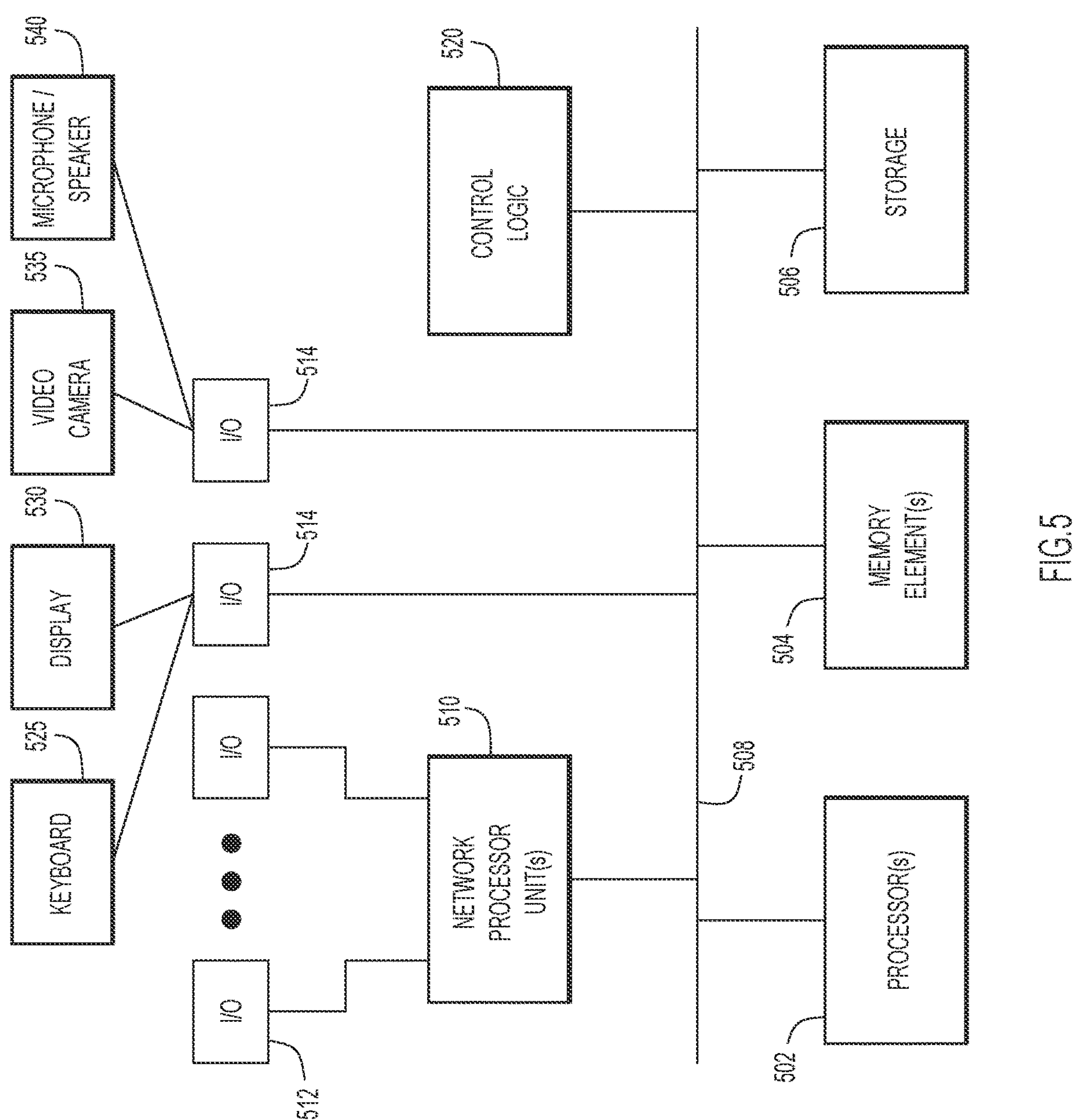
FIG. 5 is a hardware block diagram of a computer device that may be configured to perform the user device operations involved in performing one or more actions when a participant is unauthorized to receive information associated with a topic in a communication session, according to an example embodiment.

Referring to FIG. 5, FIG. 5 illustrates a hardware block diagram of a computing/computer device 500 that may perform functions of a user device associated with operations discussed herein in connection with the techniques depicted in FIGS. 1, 2, 3A, 3B, and 4. In various embodiments, a computing device, such as computing device 500 or any combination of computing devices 500, may be configured as any devices as discussed for the techniques depicted in connection with FIGS. 1, 2, 3A, 3B, and 4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard 525, keypad, a touch screen, and/or any other suitable input and/or output device now known or hereafter developed. This may be the case, in particular, when the computer device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 530 shown in FIG. 5, particularly when the computer device 500 serves as a user device as described herein. Display 530 may have touch-screen display capabilities. Additional external devices may include a video camera 535 and microphone/speaker combination 540.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 6:
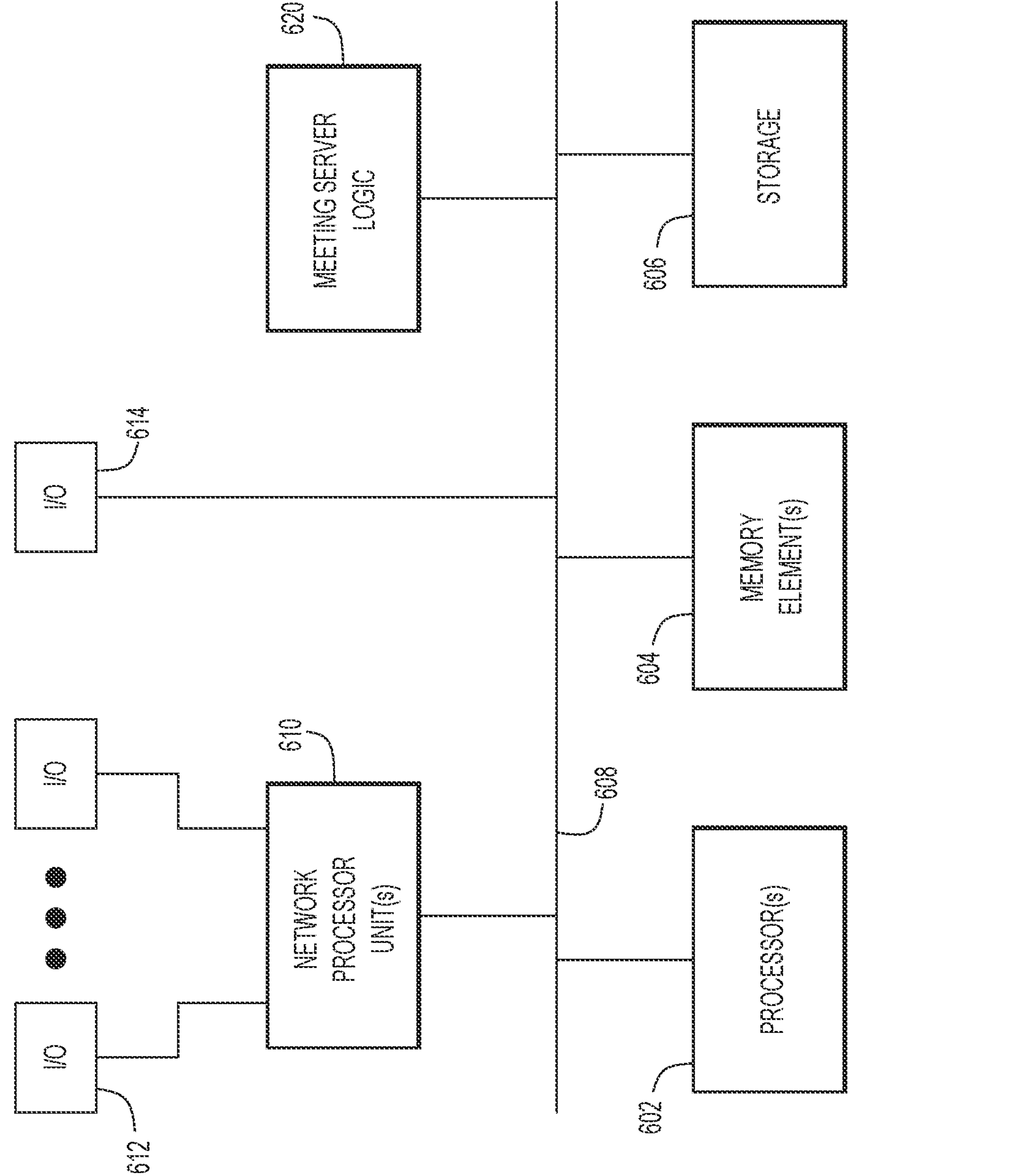
FIG. 6 is a hardware diagram of a computer device that may be configured to perform the server operations involved in performing one or more actions when a participant is unauthorized to receive information associated with a topic in a communication session, according to an example embodiment.

FIG. 6 illustrates a block diagram of a computing device 600 that may perform the functions of the server(s) 130 described herein. The computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and application server logic 620. In various embodiments, instructions associated with the application server logic 620 is configured to perform the meeting server operations described herein.

In one form, a method is provided that includes transmitting a transcript of a communication session to a large language model (LLM) while the communication session is occurring; receiving, from the LLM, an indication of a security level associated with a current topic of the communication session based on the transcript; determining whether a participant of the communication session is authorized to receive information associated with the current topic based on the security level associated with the current topic; and performing one or more actions when the participant is not authorized to receive the information associated with the current topic.

In one example, determining whether the participant is authorized to receive the information includes performing a lookup in user data to identify a security clearance level associated with the participant. In another example, the LLM is trained to classify the current topic of the communication session using previous documents and projects and topics associated with the previous documents and projects. In another example, performing the one or more actions includes removing the participant from the communication session. In another example, performing the one or more actions includes preventing the information from being transmitted to the participant. In another example, performing the one or more actions includes: alerting other participants of the communication session that a security breach has occurred, and logging the security breach. In another example, an indication of the current topic and the indication of the security level are stored in an entry of a topic data store. In another example, transmitting the transcript includes continuously transmitting the transcript while the communication session is occurring.

In another form, a device is provided that includes a memory; a network interface configured to enable network communications; and a processor, wherein the processor is configured to perform operations including: transmitting a transcript of a communication session to a large language model (LLM) while the communication session is occurring; receiving, from the LLM, an indication of a security level associated with a current topic of the communication session based on the transcript; determining whether a participant of the communication session is authorized to receive information associated with the current topic based on the security level associated with the current topic; and performing one or more actions when the participant is not authorized to receive the information associated with the current topic.

In yet another form, one or more non-transitory computer readable storage media encoded with instructions are provided that, when executed by a processor of an end device, cause the processor to execute a method that includes transmitting a transcript of a communication session to a large language model (LLM) while the communication session is occurring; receiving, from the LLM, an indication of a security level associated with a current topic of the communication session based on the transcript; determining whether a participant of the communication session is authorized to receive information associated with the current topic based on the security level associated with the current topic; and performing one or more actions when the participant is not authorized to receive the information associated with the current topic.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

transmitting a transcript of a communication session to a large language model (LLM) while the communication session is occurring, wherein the communication session is associated with a first security level;

receiving, from the LLM, an indication of a second security level associated with a current topic of the communication session based on the transcript, wherein the LLM determines the current topic of the communication session while the communication session is occurring based on the transcript of the communication session, and wherein the LLM determines the second security level associated with the current topic;

changing a security level associated with the communication session from the first security level to the second security level when the second security level is higher than the first security level;

determining whether a participant of the communication session is authorized to receive information associated with the current topic based on the changed security level; and while the communication session is occurring, performing one or more actions when the participant is not authorized to receive the information associated with the current topic.

2. The method of claim 1, wherein determining whether the participant is authorized to receive the information includes performing a lookup in user data to identify a security clearance level associated with the participant.

3. The method of claim 1, wherein the LLM is trained to classify the current topic of the communication session using previous documents and projects and topics associated with the previous documents and projects.

4. The method of claim 1, wherein performing the one or more actions includes removing the participant from the communication session.

5. The method of claim 1, wherein performing the one or more actions includes preventing the information from being transmitted to the participant.

6. The method of claim 1, wherein performing the one or more actions includes:

alerting other participants of the communication session that a security breach has occurred, and logging the security breach.

7. The method of claim 1, wherein an indication of the current topic and the indication of the second security level are stored in an entry of a topic data store.

8. The method of claim 1, wherein transmitting the transcript includes continuously transmitting the transcript while the communication session is occurring.

9. A device comprising:

a memory;

a network interface configured to enable network communications; and a processor, wherein the processor is configured to perform operations comprising:

transmitting a transcript of a communication session to a large language model (LLM) while the communication session is occurring, wherein the communication session is associated with a first security level;

receiving, from the LLM, an indication of a second security level associated with a current topic of the communication session based on the transcript, wherein the LLM determines the current topic of the communication session while the communication session is occurring based on the transcript of the communication session, and wherein the LLM determines the second security level associated with the current topic;

changing a security level associated with the communication session from the first security level to the second security level when the second security level is higher than the first security level;

determining whether a participant of the communication session is authorized to receive information associated with the current topic based on the changed security level; and performing one or more actions when the participant is not authorized to receive the information associated with the current topic.

10. The device of claim 9, wherein the processor is configured to perform the operation of determining whether the participant is authorized to receive the information by performing a lookup in user data to identify a security clearance level associated with the participant.

11. The device of claim 9, wherein the LLM is trained to classify the current topic of the communication session using previous documents and projects and topics associated with the previous documents and projects.

12. The device of claim 9, wherein the processor is configured to perform the operation of performing the one or more actions by removing the participant from the communication session.

13. The device of claim 9, wherein the processor is configured to perform the operation of performing the one or more actions by preventing the information from being transmitted to the participant.

14. The device of claim 9, wherein the processor is configured to perform the operation of performing the one or more actions by:

alerting other participants of the communication session that a security breach has occurred, and logging the security breach.

15. The device of claim 9, wherein an indication of the current topic and the indication of the second security level are stored in an entry of a topic data store.

16. The device of claim 9, wherein the processor is configured to perform the operation of transmitting the transcript by continuously transmitting the transcript while the communication session is occurring.

17. One or more non-transitory computer readable storage media encoded with instructions that, when executed by a processor of an end device, cause the processor to execute a method comprising:

transmitting a transcript of a communication session to a large language model (LLM) while the communication session is occurring, wherein the communication session is associated with a first security level;

receiving, from the LLM, an indication of a second security level associated with a current topic of the communication session based on the transcript, wherein the LLM determines the current topic of the communication session while the communication session is occurring based on the transcript of the communication session, and wherein the LLM determines the second security level associated with the current topic;

changing a security level associated with the communication session from the first security level to the second security level when the second security level is higher than the first security level;

determining whether a participant of the communication session is authorized to receive information associated with the current topic based on the changed security level; and performing one or more actions when the participant is not authorized to receive the information associated with the current topic.

18. The one or more non-transitory computer readable storage media of claim 17, wherein transmitting the transcript includes continuously transmitting the transcript while the communication session is occurring.

19. The one or more non-transitory computer readable storage media of claim 17, wherein determining whether the participant is authorized to receive the information includes performing a lookup in user data to identify a security clearance level associated with the participant.

20. The one or more non-transitory computer readable storage media of claim 17, wherein an indication of the current topic and the indication of the second security level are stored in an entry of a topic data store.

* * * * *